US012455801B2

(12) United States Patent
Hu

(10) Patent No.: US 12,455,801 B2
(45) Date of Patent: Oct. 28, 2025

(54) FULL EVENT TRACKING METHOD AND APPARATUS FOR SINGLE PAGE APPLICATION SCREEN, DEVICE, AND STORAGE MEDIUM

(71) Applicant: Beijing Volcano Engine Technology Co., Ltd., Beijing (CN)

(72) Inventor: Po Hu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/986,080

(22) Filed: Dec. 18, 2024

(65) Prior Publication Data

US 2025/0245115 A1     Jul. 31, 2025

(30) Foreign Application Priority Data

Dec. 18, 2023  (CN) .......................... 202311745004.8

(51) Int. Cl.
*G06F 11/30* (2006.01)
*G06F 9/451* (2018.01)
*G06F 9/54* (2006.01)

(52) U.S. Cl.
CPC .......... *G06F 11/3055* (2013.01); *G06F 9/451* (2018.02); *G06F 9/54* (2013.01)

(58) Field of Classification Search
None
See application file for complete search history.

(56) References Cited

FOREIGN PATENT DOCUMENTS

WO    WO-2021183690 A1 *   9/2021   ......... G06F 3/04883

* cited by examiner

*Primary Examiner* — Cai Y Chen

(57) ABSTRACT

The present disclosure relates to the field of computer technologies, and discloses a full event tracking method and apparatus for a single page application screen, a device, and a storage medium. The method includes: obtaining a response component corresponding to a target single page application screen; in response to the response component being a screen container component, extracting a component feature parameter of the screen container component; determining, based on the component feature parameter, whether a current running state of the target single page application screen is a loading state; in response to the current running state being the loading state, obtaining routing information of the target single page application screen; and generating event tracking information of the target single page application screen by triggering event tracking for the target single page application screen based on the routing information.

20 Claims, 7 Drawing Sheets

FULL EVENT TRACKING METHOD AND APPARATUS FOR SINGLE PAGE APPLICATION SCREEN, DEVICE, AND STORAGE MEDIUM

CROSS-REFERENCE TO RELATED APPLICATION(S)

This application claims priority to Chinese Application No. 202311745004.8 filed on Dec. 18, 2023, the disclosure of which is incorporated herein by reference in its entity.

TECHNICAL FIELD

The present disclosure relates to the field of computer technologies, and in particular, to a full event tracking method and apparatus for a single page application screen, a device, and a storage medium.

BACKGROUND

With the development of computer technologies, a variety of applications have emerged. An application implemented based on a React Native framework includes a plurality of single page applications (SPAs), and various contents, such as videos and hot news, are displayed through SPA screens. In order to clearly understand browsing information generated for each SPA screen, event tracking needs to be performed on the SPA screen. However, the React Native framework does not provide a full event tracking technology for SPA screens, nor does it provide an interface required by the full event tracking technology.

SUMMARY

In a first aspect, the present disclosure provides a full event tracking method for a single page application screen, comprising: obtaining a response component corresponding to a target single page application screen; in response to the response component being a screen container component, extracting a component feature parameter of the screen container component; determining, based on the component feature parameter, whether a current running state of the target single page application screen is a loading state; in response to the current running state being the loading state, obtaining routing information of the target single page application screen; and generating event tracking information of the target single page application screen by triggering event tracking for the target single page application screen based on the routing information.

In a second aspect, the present disclosure provides a full event tracking apparatus for a single page application screen, comprising: an obtaining module configured to obtain a response component corresponding to a target single page application screen; a feature parameter extracting module configured to, in response to the response component being a screen container component, extract a component feature parameter of the screen container component; a running state monitoring module configured to determine, based on the component feature parameter, whether a current running state of the target single page application screen is a loading state; a routing information obtaining module configured to, in response to the current running state being the loading state, obtain routing information of the target single page application screen; and an event tracking module configured to generate event tracking information of the target single page application screen by triggering event tracking for the target single page application screen based on the routing information.

In a third aspect, the present disclosure provides a computer device, comprising: a memory and a processor, the memory and the processor being communicatively connected to each other, the memory storing computer instructions, and the processor, when executing the computer instructions, performing the full event tracking method for a single page application screen according to the first aspect or any of the corresponding implementations thereof.

In a fourth aspect, the present disclosure provides a computer-readable storage medium having computer instructions stored thereon, where the computer instructions are configured to cause a computer to perform the full event tracking method for a single page application screen according to the first aspect or any of the corresponding implementations thereof.

BRIEF DESCRIPTION OF THE DRAWINGS

In order to more clearly describe the specific embodiments of the present disclosure or the technical solutions in the prior art, the accompanying drawings for describing the specific embodiments or the prior art will be briefly described below. Apparently, the accompanying drawings in the following description show some embodiments of the present disclosure, and a person of ordinary skill in the art may still derive other drawings from these accompanying drawings without creative efforts.

DETAILED DESCRIPTION

Figure 1:
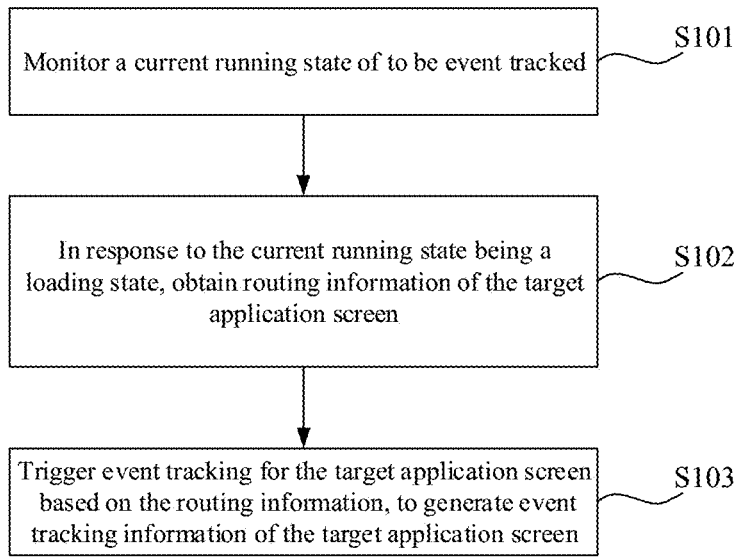
FIG. 1 is a schematic flowchart of a full event tracking method for a single page application screen according to embodiments of the present disclosure.

In order to make the objectives, technical solutions, and advantages of the embodiments of the present disclosure clearer, the technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

When event tracking is performed on an SPA screen, the related art mainly implements full event tracking of the SPA screen by executing a JS script, modifying source code of React Navigation, and injecting code developed for event tracking the SPA screen. However, modifying the source code of React Navigation will affect the running stability of the application, and adjusting the source code incurs high maintenance costs. Further, when the full event tracking is turned off, a script needs to be executed to clear the code. If there is a problem in this process, all dependencies need to be reinstalled, which is more complicated. Moreover, the foregoing manner is difficult to be compatible with other full event tracking manners, affecting the implementation inclusiveness of full event tracking.

In view of this, the present disclosure provides a full event tracking method and apparatus for a single page application screen, a device, and a storage medium, to solve the problem that it is difficult to maintain running stability of an application when full event tracking of an SPA screen is triggered. The full event tracking method for a single page application screen provided in the embodiments of the present disclosure can monitor a running state of the target single page application screen, and trigger event tracking of the target single page application screen according to routing information of the target single page application screen when the running state is a loading state. In this way, event tracking can be dynamically triggered during running of the target single page application screen, without modifying source code, ensuring running stability of the application, and without clearing code after full event tracking is completed, simplifying the event tracking process and further reducing maintenance costs.

The technical solution of the present disclosure triggers event tracking of the target single page application screen according to routing information of the target single page application screen when the running state is a loading state, so that event tracking can be dynamically triggered during running of the target single page application screen, without modifying source code, ensuring running stability of the application, and without affecting other full event tracking manners, with strong inclusiveness. Since the source code does not need to be modified during event tracking, the code does not need to be cleared after full event tracking is completed, thereby simplifying the event tracking process and reducing maintenance costs.

According to embodiments of the present disclosure, embodiments of a full event tracking method for a single page application screen are provided. It should be noted that the steps shown in the flowcharts of the accompanying drawings may be executed in a computer system such as a set of computer-executable instructions, and although a logical order is shown in the flowcharts, in some cases, the steps shown or described may be executed in an order different from that herein.

In this embodiment, a full event tracking method for a single page application screen is provided, which may be used in a computer device, such as a mobile phone, a tablet computer, a computer, etc. FIG. 1 is a flowchart of the full event tracking method for a single page application screen according to embodiments of the present disclosure. As shown in FIG. 1, the process includes the following steps:

Step S101: Monitoring a current running state of a target single page application screen to be event tracked.

The target single page application screen is a single page application (SPA) screen in an application based on a React Native framework, that is, an SPA screen currently entered or left. The current running state is used to represent a state of the SPA screen. Specifically, the current running state includes a loading state and a closing state, where the loading state represents entering the SPA screen, and the closing state represents leaving the SPA screen.

The target single page application screen is managed by a screen route stack, and the screen route stack records navigation history and screen switching information of the target single page application screen. Specifically, the screen route stack may record a history of the SPA screen, that is, whenever a user navigates to a new SPA screen, the routing information of the SPA screen is added to the screen route stack; the screen route stack may also navigate to a previously visited SPA screen or a next accessible SPA screen; during screen refreshing or initial loading, the screen route stack may add the routing information of the current SPA screen to the stack based on a URL or other information; and the screen route stack may also switch to a different SPA screen or replace the routing information of the current SPA screen by adding new routing information.

The computer device is provided with a screen route stack, and the running state of the SPA screen is monitored by the screen route information recorded in the screen route stack, to determine the current running state of the SPA screen.

Step S102: In response to the current running state being a loading state, obtaining routing information of the target single page application screen.

The loading state indicates that the target single page application screen is in a displayed state, for example, the target single page application screen is entered for the first time or switched to from another screen. The routing information of the screen is data describing a location and a state of the target single page application screen in the application, and routing information of each target single page application screen is differently identified, that is, the target single page application screen can be uniquely determined through the routing information identifier. Specifically, the routing information may include: a routing path, a routing parameter, a routing state, a routing event, and the like. The routing path refers to a URL path corresponding to the target single page application screen, and a screen can be uniquely identified through the routing path; the routing parameter refers to a dynamic parameter in the URL, and is used to describe a specific attribute or identifier of the screen; the routing state refers to state information of the screen during navigation, for example, a selected state, an expanded/collapsed state, a scroll position, and the like of the screen; and the routing event refers to an event triggered during screen navigation, for example, events such as screen loading, screen switching, and backward/forward.

Whether the target single page application screen is loaded or closed can be determined by monitoring the current running state of the target single page application screen. A routing library or plugin for managing application routing information is deployed in the computer device. When it is determined that the current running state of the target single page application screen is the loading state, the routing information of the SPA screen may be obtained from the routing library or plugin, to send the routing information to the screen route stack.

Step S103: Generating event tracking information of the target single page application screen by triggering event tracking for the target single page application screen based on the routing information.

The event tracking information is used to represent browsing information generated for the target single page application screen. Specifically, the event tracking information includes a page view event tracking (pageview) and a page leave event tracking (pageleave). When it is determined that the target single page application screen is in the loading state, the location of the target single page application screen in the application can be uniquely determined in combination with the routing information, so that the routing information of the target single page application screen is sent to the screen route stack according to the loading state to trigger event tracking for the target single page application screen, to generate corresponding event tracking information.

Figure 2:
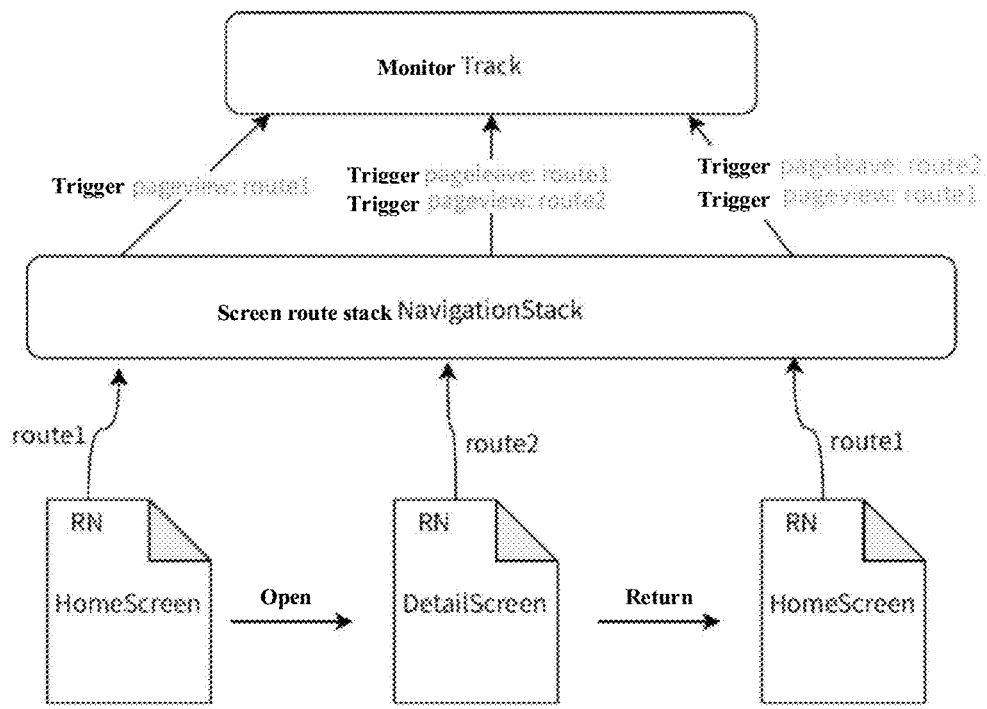
FIG. 2 is a schematic diagram of specific event tracking of a target single page application screen according to embodiments of the present disclosure.

For example, as shown in FIG. 2, when a screen Home-Screen is entered for the first time, the screen HomeScreen is used as the target single page application screen to be event tracked, and a pageview event tracking (i.e., pageview: route1) for the screen HomeScreen is triggered at this time; when the screen DetailScreen is entered from the screen HomeScreen, both the screen HomeScreen and the screen DetailScreen are the target single page application screens to be event tracked, and in combination with the running state of each target single page application screen, a pageleave event tracking (i.e., pageleave: route1) for the screen HomeScreen and a pageview event tracking (i.e., pageview: route2) for the screen DetailScreen are triggered; and when the screen DetailScreen is closed and the screen HomeScreen is returned to, a pageleave event tracking (i.e., pageleave: route2) for the screen DetailScreen and a pageview event tracking (i.e., pageview: route1) for the screen HomeScreen are triggered.

The full event tracking method for a single page application screen provided in these embodiments can monitor a running state of the target single page application screen, and trigger event tracking of the target single page application screen according to routing information of the target single page application screen when the running state is a loading state. In this way, event tracking can be dynamically triggered during running of the target single page application screen, without modifying source code, ensuring running stability of the application, and without clearing code after full event tracking is completed, simplifying the event tracking process and further reducing maintenance costs.

Figure 3:
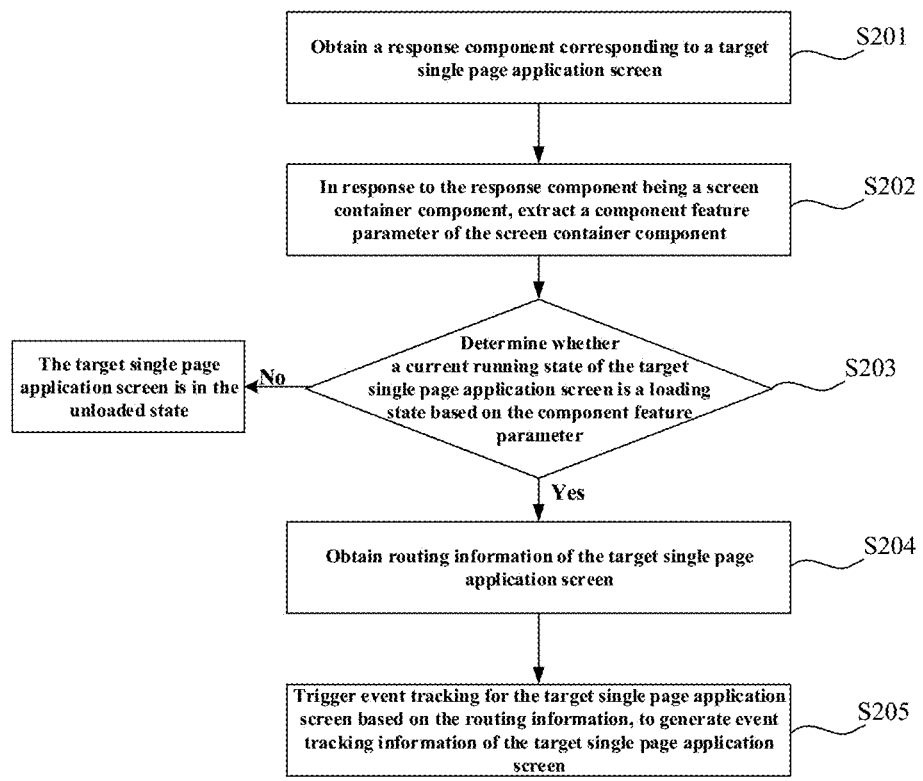
FIG. 3 is a schematic flowchart of another full event tracking method for a single page application screen according to embodiments of the present disclosure.

In this embodiment, a full event tracking method for a single page application screen is provided, which may be used in a computer device, such as a mobile phone, a tablet computer, a computer, etc. FIG. 3 is a flowchart of the full event tracking method for a single page application screen according to embodiments of the present disclosure. As shown in FIG. 3, the process includes the following steps:

Step S201: Obtaining a response component corresponding to a target single page application screen.

The response component is a declarative component for the target single page application screen, that is, a React component of the target single page application screen. The target single page application screen is described in a declarative manner through the React component, and the target single page application screen is abstractly constructed, so that the constructed target single page application screen is displayed to a user to implement interaction between the target single page application screen and the user.

Specifically, the response component is configured to receive external data through a property parameter (props) and perform screen rendering according to the received external data, and manage data state changes of the screen through a state parameter (state), and respond to interaction between the user and the screen through an event handler and a callback function.

The computer device creates a response element (React element) for the target single page application screen by injecting a response component generation method (React.createElement) in a JS environment to obtain an internal data structure (i.e., a fiber object) of the React element, where the internal data structure contains component information, and the React component corresponding to the target single page application screen is generated in combination with the component information.

Step S202: In response to the response component being a screen container component, extracting a component feature parameter of the screen container component.

The screen container component is a component wrapping content of the target single page application screen. The screen container component mainly includes a navigation stack (stack) container and a screen navigation (tab) container. The stack container is configured to manage routing information of a screen. For example, when a screen is opened, the screen is pushed into a stack, and when the screen is left, the screen is popped out of the stack. The tab container has a top tab and a bottom tab. The tabs are arranged in a home screen, and each tab corresponds to a screen. When a tab is clicked, the screen corresponding to the tab is opened.

A component structure and features of the response component are analyzed to determine whether the React component is a stack container or a tab container. Specifically, since the stack container has a vertically stacked effect, each screen is displayed in sequence of stacking. Here, whether the React component is a stack container may be determined by analyzing subcomponents or sub-elements contained in the React component. If the subcomponents (or sub-elements) are displayed in a stacked order and can be switched to another screen in a specific manner, it may be determined that the React component is a stack container. Of course, since the stack container has a state for managing a currently displayed screen, whether the React component is a stack container may also be determined by analyzing the state of the React component.

Specifically, since the tab container is a horizontal or vertical navigation menu, each tab represents a screen. Here, whether the React component is a tab container may be determined by analyzing subcomponents or sub-elements of the React component. If the subcomponents (or sub-elements) are a group of tabs, and different content screens can be switched to be displayed by clicking on the tabs, it may be determined that the React component is a tab container. Of course, since the tab container has a state for managing a currently selected tab, whether the React component is a tab container may also be determined by analyzing the state of the React component.

The screen container component has a corresponding component structure, and subcomponents contained in the screen container component and component parameters carried in each subcomponent may be determined through the component structure. The component feature parameter is a key parameter associated with loading of the target single page application screen, that is, whether a running state of the target single page application screen is a loading state may be determined through the component feature parameter.

When it is determined that the response component is a screen container component, a component structure of the screen container component is analyzed to obtain a plurality of subcomponents contained in the screen container component. The subcomponents are traversed to determine a target subcomponent associated with a screen running state, and then the required component feature parameter is analyzed from component parameters carried in the subcomponent.

In some optional implementations, step S202 may include:

Step a1: Obtaining a plurality of subcomponents of the screen container component by parsing a component structure of the screen container component.

Step a2: Determining a target subcomponent associated with a screen running state by traversing component parameters of the subcomponents.

Step a3: Determining the component feature parameter associated with the screen running state by decomposing a component parameter of the target subcomponent.

The subcomponent is a component contained in the screen container component; and the target subcomponent is a component selected from the plurality of subcomponents and associated with the screen running state.

Specifically, the component feature parameter includes a screen identification page_key, a screen title page_title, and a screen path page_path. The screen identification page_key is taken from a name attribute of a route object corresponding to the container component; the screen title page_title is taken from a title attribute of an option object (options object) corresponding to the container component; and the screen path page_path is taken from a path attribute of the option object (options object) corresponding to the container component.

By analyzing the component structure of the screen container component, each subcomponent contained in the screen container component and the component parameter carried in each subcomponent may be determined. The component parameters of the subcomponents are sequentially traversed to determine the target subcomponent containing the component feature parameter, and then the component feature parameter associated with the screen running state is screened out by decomposing the component parameter of the target subcomponent.

Figure 4:
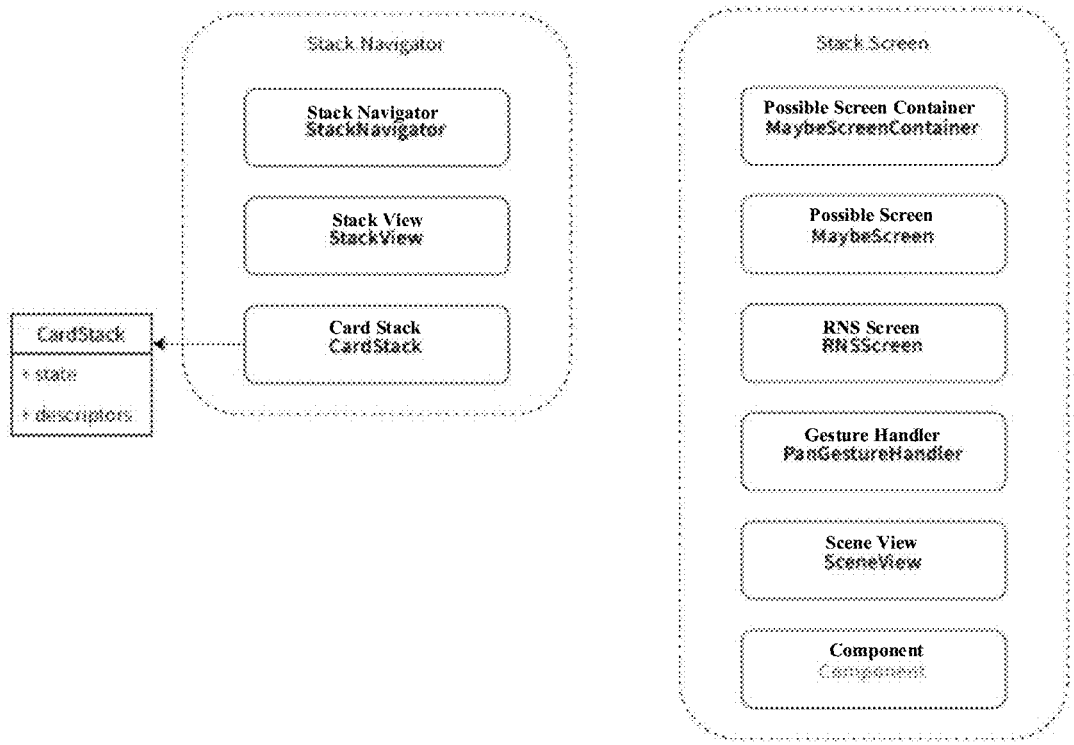
FIG. 4 is a schematic diagram of a component structure of a stack container according to embodiments of the present disclosure.
Figure 5:
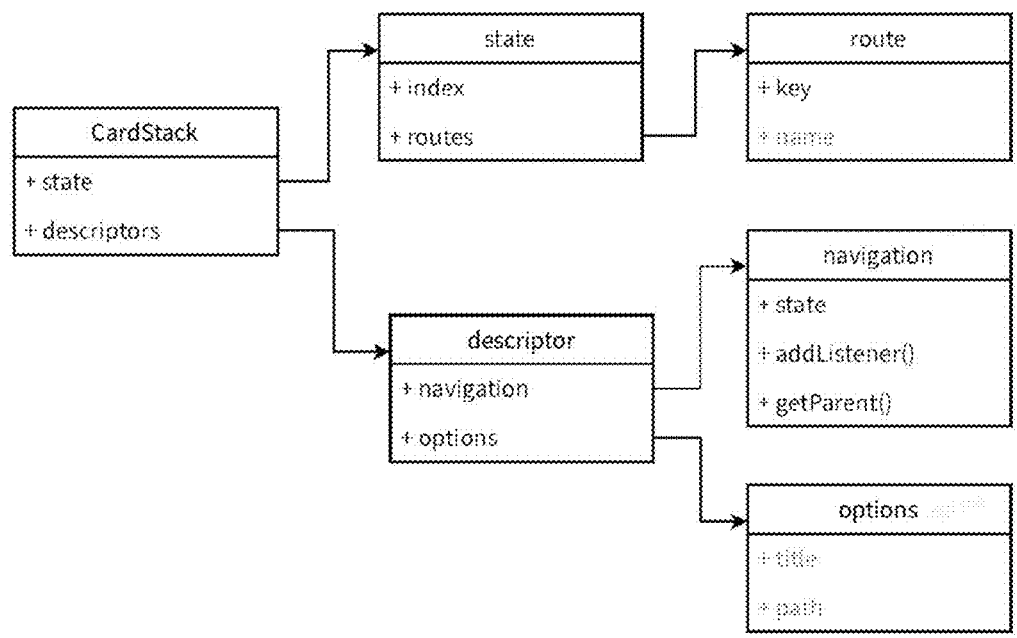
FIG. 5 is a schematic diagram of extraction of a component feature parameter of the stack container according to embodiments of the present disclosure.

Specifically, the screen container component includes a navigation stack (stack) container and a screen navigation (tab) container. As shown in a component structure of the stack container in FIG. 4, the component structure of the stack container is analyzed to obtain a plurality of subcomponents contained in the stack container. A target subcomponent, that is, a card stack (CardStack), containing the component feature parameter may be selected by traversing the subcomponents. In the card stack (CardStack), the component parameter thereof is decomposed step by step to obtain a route object and an options object corresponding to the card stack (CardStack), and then the required component feature parameter is extracted from the route object and the options object, as shown in FIG. 5.

Figure 6:
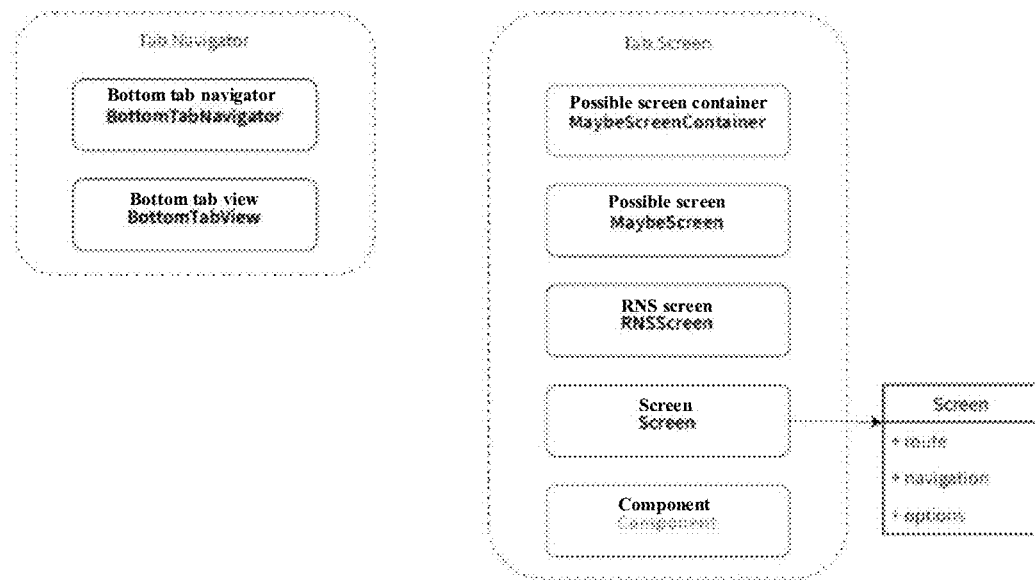
FIG. 6 is a schematic diagram of a component structure of a tab container according to embodiments of the present disclosure.
Figure 7:
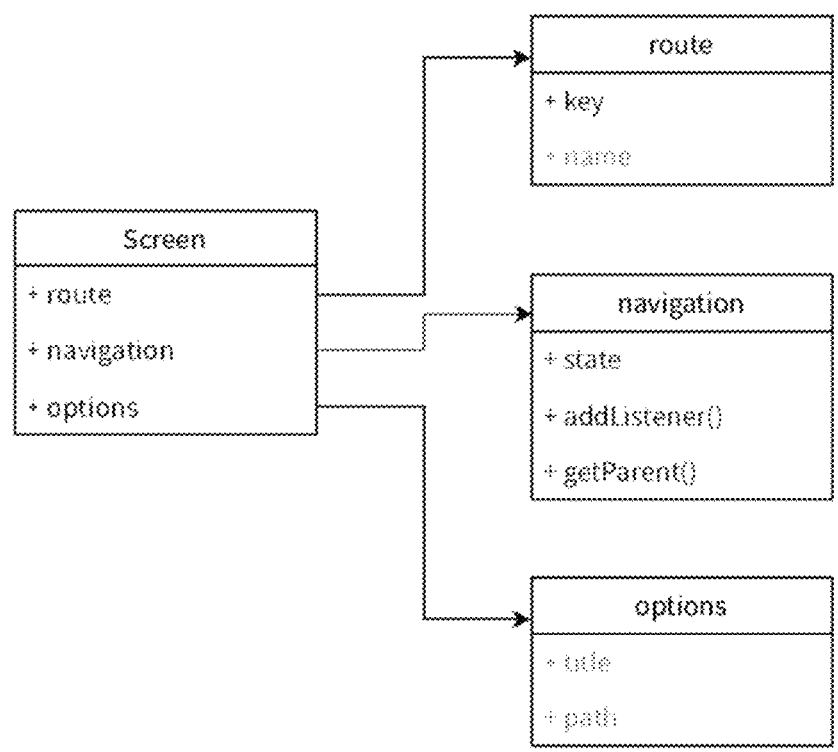
FIG. 7 is a schematic diagram of extraction of a component feature parameter of the tab container according to embodiments of the present disclosure.

As shown in a component structure of the tab container in FIG. 6, the component structure of the tab container is analyzed to obtain a plurality of subcomponents contained in the tab container. A target subcomponent, that is, a screen subcomponent (Screen), containing the component feature parameter may be selected by traversing the subcomponents. In the screen subcomponent (Screen), the component parameter thereof is decomposed step by step to obtain a route object and an options object corresponding to the screen subcomponent (Screen), and then the required component feature parameter is extracted from the route object and the options object, as shown in FIG. 7.

In the foregoing implementation, the component structure of the screen container component is analyzed to determine the component feature parameter associated with the screen state, to determine the screen loaded by the screen container component, which is convenient for accurately detecting the loading state of the target single page application screen.

Step S203: Determining, based on the component feature parameter, whether a current running state of the target single page application screen is a loading state.

With reference to the component feature parameter extracted from the screen container component, an application screen currently loaded by the screen container component may be determined. If the application screen loaded by the screen container component is the target single page application screen, it may be determined that the current running state of the target single page application screen is the loading state; or if the application screen loaded by the screen container component is not the target single page application screen, it may be determined that the current running state of the target single page application screen is a non-loading state, that is, the target single page application screen is not displayed, for example, in a hidden state or a leaving state.

In some optional implementations, step S203 may include:

Step b1: Obtaining a loading feature parameter corresponding to the target single page application screen.

Step b2: In response to the component feature parameter being consistent with the loading feature parameter, determining that the running state of the target single page application screen is the loading state.

The loading feature parameter is a parameter required for loading the target single page application screen, and the loading feature parameter includes a screen identification page_key, a screen title page_title, and a screen path page_path. The screen identification page_key is used to uniquely determine a loaded application screen, the screen title page_title is used to determine a name of the loaded application screen, and the screen path page_path is used to determine a loading path of the loaded application screen.

The target single page application screen has corresponding screen loading information, and the loading feature parameter of the target single page application screen may be obtained by analyzing the screen loading information. The loading feature parameter of the target single page application screen is compared with the component feature parameter extracted from the screen container component, to determine whether the two are consistent. If the component feature parameter is consistent with the loading feature parameter, it indicates that the application screen currently loaded by the screen container component is the target single page application screen. At this time, it may be determined that the running state of the target single page application screen is the loading state; otherwise, it is determined that the running state of the target single page application screen is a non-loading state (for example, a hidden state or a leaving state).

In the foregoing implementation, whether the target single page application screen is loaded is determined by comparing the loading feature parameter with the component feature parameter, which ensures accuracy of determining the screen loading state, and only the loading feature parameter of the target single page application screen and the component feature parameter of the screen container component need to be extracted, without modifying any source code, ensuring running stability of the application.

Step S204: In response to the current running state being the loading state, obtaining routing information of the target single page application screen. For detailed description, refer to the related description corresponding to the foregoing embodiment, which will not be repeated here.

Step S205: Generating event tracking information of the target single page application screen by triggering event tracking for the target single page application screen based on the routing information. For detailed description, refer to the related description corresponding to the foregoing embodiment, which will not be repeated here.

The full event tracking method for a single page application screen provided in these embodiments can analyze a response component corresponding to the target single page application screen, and when it is determined that the response component is a screen container component, determine the running state of the target single page application screen according to a component feature parameter of the screen container component. In this way, whether the target single page application screen is in the loading state can be accurately determined, so that event tracking of the target single page application screen is triggered in the loading state, allowing the target single page application screen to dynamically trigger event tracking during running, ensuring the accuracy of event tracking.

Figure 8:
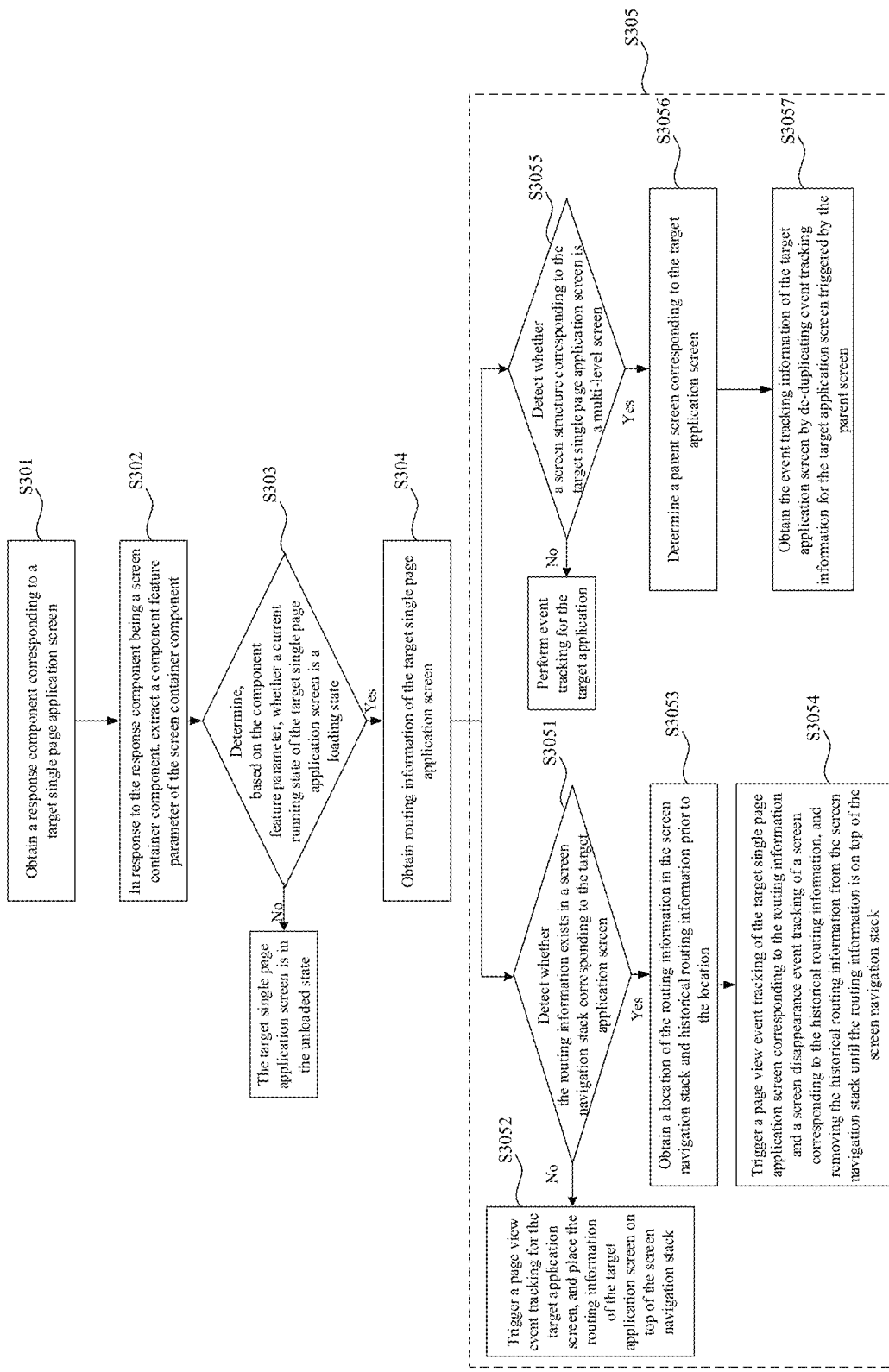
FIG. 8 is a schematic flowchart of yet another full event tracking method for a single page application screen according to embodiments of the present disclosure.

In this embodiment, a full event tracking method for a single page application screen is provided, which may be used in a computer device, such as a mobile phone, a tablet computer, a computer, etc. FIG. 8 is a flowchart of the full event tracking method for a single page application screen according to embodiments of the present disclosure. As shown in FIG. 8, the process includes the following steps:

Step S301: Obtaining a response component corresponding to a target single page application screen. For detailed description, refer to the related description corresponding to the foregoing embodiment, which will not be repeated here.

Step S302: In response to the response component being a screen container component, extracting a component feature parameter of the screen container component. For detailed description, refer to the related description corresponding to the foregoing embodiment, which will not be repeated here.

Step S303: Determining, based on the component feature parameter, whether a current running state of the target single page application screen is a loading state. For detailed description, refer to the related description corresponding to the foregoing embodiment, which will not be repeated here.

Step S304: In response to the current running state being the loading state, obtaining routing information of the target single page application screen. For detailed description, refer to the related description corresponding to the foregoing embodiment, which will not be repeated here.

Step S305: Generating event tracking information of the target single page application screen by triggering event tracking for the target single page application screen based on the routing information.

Specifically, step S305 may include:

Step S3051: Detecting whether the routing information exists in a screen route stack corresponding to the target single page application screen.

The screen route stack is used to record navigation history and screen switching information of an application screen. Specifically, each application screen has corresponding routing information, which is represented by a route object. The computer device sends the routing information of the loaded application screen to the screen route stack in the form of the route object. The pageview event tracking or the pageleave event tracking of the application screen is triggered by the routing information passed into the screen route stack.

When detecting that the target single page application screen is in the loading state, the computer device can obtain the routing information of the target single page application screen, and traverse historical routing information already present in the screen route stack to compare the routing information of the target single page application screen with the historical routing information, to determine whether the routing information exists in the screen route stack corresponding to the target single page application screen. If the routing information is not present in the screen route stack, step S3052 is performed; otherwise, step S3053 is performed.

Step S3052: in response to the routing information not existing in the screen route stack, triggering the page view event tracking for the target single page application screen, and placing the routing information of the target single page application screen at top of the screen route stack.

When the routing information is not present in the screen route stack, it indicates that the target single page application screen is entered for the first time. At this time, original routing information at the top of the screen route stack is determined, a pageleave event tracking of an application screen corresponding to the original routing information is triggered, a pageview event tracking for the target single page application screen is triggered, and the routing information of the target single page application screen is passed to the top of the screen route stack.

Figure 9:
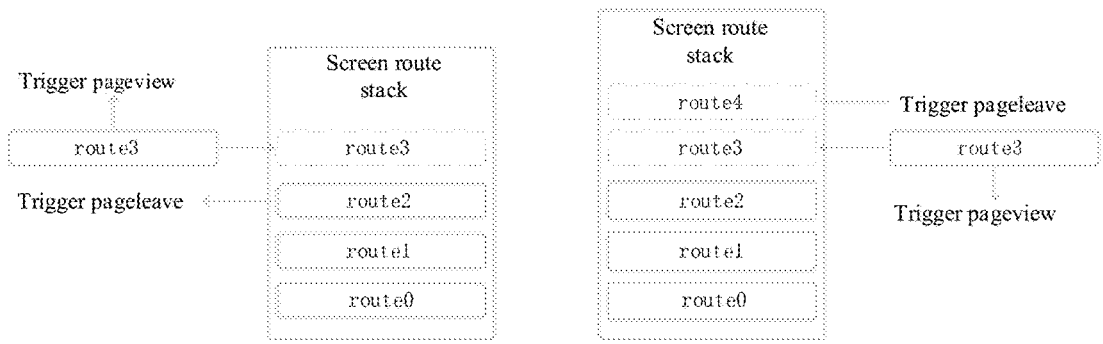
FIG. 9 is a schematic diagram of stack in and stack out of routing information according to embodiments of the present disclosure.

As shown in FIG. 9, if the routing information corresponding to the target single page application screen is route3, the original routing information at the top of the screen route stack is route2, and the routing information route3 is not present in the screen route stack. When the target single page application screen is entered for the first time, the pageleave event tracking of the application screen corresponding to route2 is triggered, the pageview event tracking of the target single page application screen is triggered, and the routing information route3 thereof is pushed to the top of the screen route stack.

Step S3053: In response to the routing information existing in the screen route stack, obtaining a location of the routing information in the screen route stack and historical routing information prior to the location.

When the routing information exists in the screen route stack, it indicates that the target single page application screen has been loaded at a historical time, and the loading this time belongs to returning to the target single page application screen from another application screen. At this time, the computer device may traverse the historical routing information present in the screen route stack to determine a location in the screen route stack to which the routing information of the target single page application screen is passed and the historical routing information prior to the location.

Step S3054: Triggering a page view event tracking of the target single page application screen corresponding to the routing information and a page leave event tracking of a screen corresponding to the historical routing information, and removing the historical routing information from the screen route stack until the routing information is at the top of the screen route stack.

Since the target single page application screen needs to be displayed currently, the pageview event tracking of the target single page application screen needs to be triggered at this time, and at the same time, the historical routing information prior to the routing information corresponding to the target single page application screen needs to be removed from the screen route stack, and the pageleave event tracking of the application screen corresponding to the historical routing information is triggered until the routing information of the target single page application screen is at top of the stack.

As shown in FIG. 9, if the routing information corresponding to the target single page application screen is route3, the original routing information at the top of the screen route stack is route4, and the routing information route3 exists in the screen route stack. When the target single page application screen is entered, the pageview event tracking of the target single page application screen is triggered, the pageleave event tracking of the application screen corresponding to route4 is triggered, and the routing information route4 thereof is removed from the screen route stack, such that the routing information route3 is at top of the screen route stack.

In some optional implementations, the foregoing method may further include:

Step S3055: Detecting whether a screen structure corresponding to the target single page application screen is a multi-level screen.

The screen structure is used to represent a layout and organization of the target single page application screen. In order to avoid that the target single page application screen is mis-recognized as a plurality of screens, the screen structure corresponding to the target single page application screen may be detected at this time, to determine whether the target single page application screen is a multi-level screen. When the target single page application screen is a multi-level screen, step S3056 is performed; otherwise, event tracking is directly performed on the target single page application screen.

In some optional implementations, step S3055 may include:

Step c1: Detecting whether multi-level nesting exists in a target screen container component corresponding to the target single page application screen.

Step c2: In response to the multi-level nesting existing in the target screen container component, determining that the screen structure corresponding to the target single page application screen is the multi-level screen.

When there is the multi-level nesting in the screen container component corresponding to the target single page application screen, the target single page application screen will be recognized as a plurality of screens, which will result in duplicate event tracking. At this time, de-duplication needs to be performed on the event tracking to ensure the accuracy of event tracking.

Figure 10:
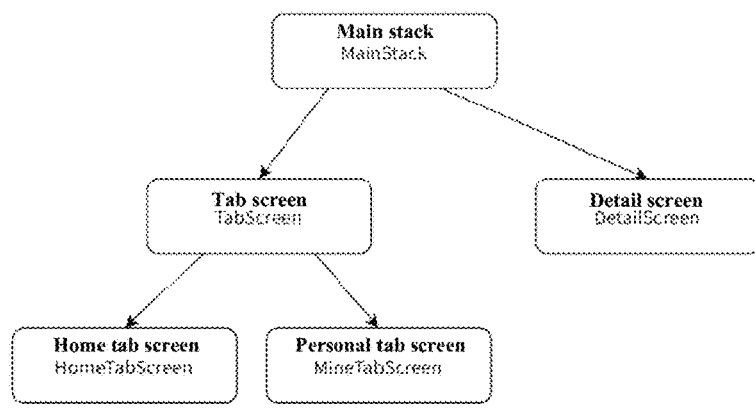
FIG. 10 is a schematic diagram of multi-level nesting of a target screen container component according to embodiments of the present disclosure.

Specifically, when it is determined that the target single page application screen is in the loading state, a component structure of a target screen container component corresponding to the target single page application screen may be further detected at this time, to determine whether there is multi-level nesting. If there is the multi-level nesting in the target screen container component, it may be determined that a screen structure corresponding to the target single page application screen is a multi-level screen. As shown in FIG. 10, there is multi-level nesting in the target screen container component: a main stack (MainStack), a tab screen (TabScreen), and a home tab screen (HomeTabScreen), and the screen structure thereof is a multi-level screen.

In the foregoing implementation, when there is the multi-level nesting in the target screen container component, the target screen container component will be recognized as a plurality of screens, which may easily result in event tracking redundancy of the target single page application screen. Whether there is the multi-level nesting in the target screen container component is detected to accurately recognize the target single page application screen in the loading state under single page application, making the event tracking of the target single page application screen more accurate.

Step S3056: In response to the screen structure being the multi-level screen, determining a parent screen corresponding to the target single page application screen.

With reference to the screen structure, a screen tree corresponding to the target single page application screen may be determined. The target single page application screen is used as a leaf node of the screen tree, and each node is traversed upward in sequence to determine a corresponding parent node until a root node is traversed. The application screen corresponding to the parent node is the parent screen. As shown in FIG. 10, if the target single page application screen is the home tab screen (HomeTabScreen), the parent screen corresponding to the target single page application screen is the tab screen (TabScreen), the root node is the main stack (MainStack), and the root node is a parent node of the parent screen.

Step S3057: Obtaining the event tracking information of the target single page application screen by de-duplicating event tracking information for the target single page application screen triggered by the parent screen.

When the event tracking information of the target single page application screen is collected, the root node and the parent screen will sequentially generate event tracking for the target single page application screen, which will result in that the event tracking of the target single page application screen is counted multiple times. At this time, de-duplication needs to be performed on the event tracking information to retain only one event tracking for the target single page application screen.

As shown in FIG. 10, when there is multi-level nesting, when the home tab screen (HomeTabScreen) (i.e., the target single page application screen) is opened, the home tab screen (HomeTabScreen) is a leaf node in the multi-level screen structure, and the root node (the main stack (MainStack)), the parent screen (the tab screen (TabScreen)), and the home tab screen (HomeTabScreen) corresponding to the home tab screen (HomeTabScreen) will sequentially generate event tracking, resulting in duplicate event tracking of the home tab screen (HomeTabScreen).

In order to accurately collect the event tracking information, a parent screen may be marked in the routing information of the target single page application screen for the screen structure at this time, and a parent-child relationship is recorded, so that when event tracking of the target single page application screen is triggered, only event tracking information triggered by a leaf node corresponding to a screen route stack of the target single page application screen is collected.

Figure 11:
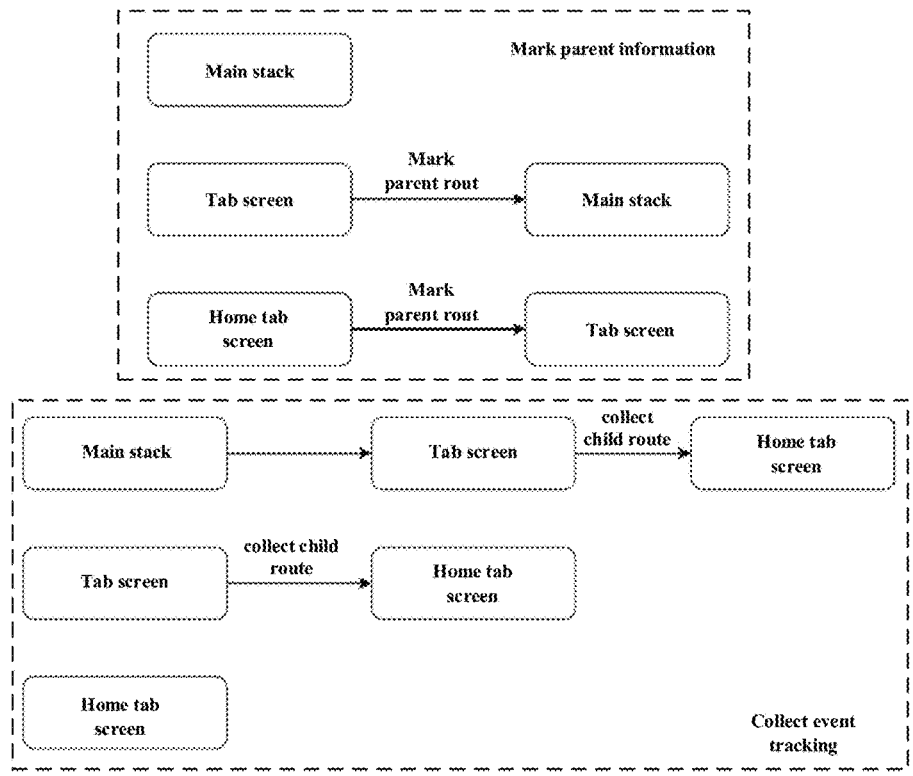
FIG. 11 is a schematic diagram of parent information marking and event tracking de-duplication according to embodiments of the present disclosure.

As shown in FIG. 11, for a multi-level nested structure of the screen route stack of the target single page application screen, parent information is marked in the routing information, and a parent-child relationship is recorded. When event tracking of the home tab screen (HomeTabScreen) is triggered, only event tracking information of the home tab screen (HomeTabScreen) as the leaf node is collected. At this time, event tracking of the home tab screen (HomeTab-Screen) will be collected multiple times, and further de-duplication needs to be performed to count the event tracking of the home tab screen (HomeTabScreen) only once.

In some optional implementations, before step S301, the foregoing method may further include:

Step d1: Obtaining a target component required for running of the target single page application screen.

Step d2: In response to an initialization configuration operation for the target component, generating a component name corresponding to the target component based on the initialization configuration operation.

The target single page application screen implemented based on the React Native framework runs online as a compressed product, so that a file size can be effectively reduced. However, code compression will cause an originally readable component to become an unreadable symbol. For example, a TouchOpacity component will become unreadable symbols such as R and J after compression.

To ensure readability of the component, the target component required for running of the target single page application screen needs to be initialized. Specifically, the computer device may detect the target component required for running of the target single page application screen to obtain a configuration screen for the target component. Then, a technician may perform initialization configuration on the target component through the configuration screen, set a component name for the target component, and hard-code the component name to avoid changes after compression. Correspondingly, the computer device may respond to an initialization configuration operation of the technician for the target component on the configuration screen to generate the component name corresponding to the target component. Specifically, a name display parameter displayName is set in the configuration screen, and the component name corresponding to the target component is set by editing the name display parameter displayName.

The initialization configuration is performed on the target component required for running of the target single page application screen to hard-code the component name corresponding to the target component, so that the readable target component can be prevented from becoming an unreadable symbol after compression, and the readability of the target component and the compatibility of various versions are improved.

The full event tracking method for a single page application screen provided in these embodiments can determine a corresponding event tracking strategy with reference to whether the routing information exists in the screen route stack when it is determined that the target single page application screen is in the loading state. In this way, event tracking for the target single page application screen may be triggered according to different event tracking strategies, ensuring the accuracy of event tracking. The parent screen is marked in the routing information of the target single page application screen for the screen structure, to de-duplicate event tracking information generated by the parent screen when event tracking of the target single page application screen is triggered. In this way, only event tracking information corresponding to the target single page application screen is collected, and accurate collection of the event tracking information is implemented.

In this embodiment, a full event tracking apparatus for a single page application screen is further provided. The apparatus is configured to implement the foregoing embodiments and preferred implementations, which will not be described again. As used below, the term "module" may be a combination of software and/or hardware that implements a predetermined function. Although the apparatus described in the following embodiments is preferably implemented in software, implementation of hardware or a combination of software and hardware is also possible and contemplated.

Figure 12:
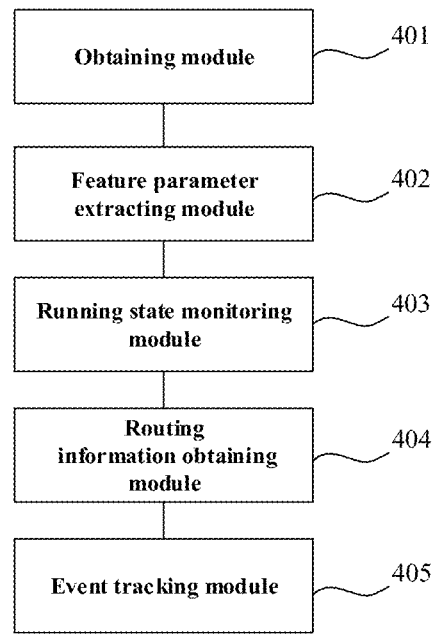
FIG. 12 is a block diagram of a structure of a full event tracking apparatus for a single page application screen according to embodiments of the present disclosure.

These embodiments provide a full event tracking apparatus for a single page application screen. As shown in FIG. 12, the apparatus includes:

An obtaining module 401 configured to obtain a response component corresponding to a target single page application screen.

A feature parameter extracting module 402 configured to, in response to the response component being a screen container component, extract a component feature parameter of the screen container component.

A running state monitoring module 403 configured to determine, based on the component feature parameter, whether a current running state of the target single page application screen is a loading state.

A routing information obtaining module 404 configured to, in response to the current running state being the loading state, obtain routing information of the target single page application screen.

An event tracking module 405 configured to generate event tracking information of the target single page application screen by triggering event tracking for the target single page application screen based on the routing information.

In some optional implementations, the feature parameter extracting module 402 may include:

An analysis unit configured to obtain a plurality of subcomponents of the screen container component by parsing a component structure of the screen container component.

A traversing unit configured to determine a target subcomponent associated with a screen running state by traversing component parameters of the subcomponents.

A decomposing unit configured to determine the component feature parameter associated with the screen running state by decomposing a component parameter of the target subcomponent.

In some optional implementations, the running state monitoring module 403 may include:

A parameter obtaining unit configured to obtain a loading feature parameter corresponding to the target single page application screen.

A determining unit configured to, in response to the component feature parameter being consistent with the loading feature parameter, determine that the running state of the target single page application screen is the loading state.

In some optional implementations, the event tracking module 405 may include:

A routing information detecting unit configured to detect whether the routing information exists in a screen route stack corresponding to the target single page application screen.

A first event tracking triggering unit configured to, in response to the routing information not existing in the screen route stack, trigger the page view event tracking for the target single page application screen, and place the routing information of the target single page application screen at top of the screen route stack.

A location obtaining subunit configured to, in response to the routing information existing in the screen route stack, obtain a location of the routing information in the screen route stack and historical routing information prior to the location.

A second event tracking triggering unit configured to trigger a page view event tracking of the target single page application screen corresponding to the routing information and a page leave event tracking of a screen corresponding to the historical routing information, and remove the historical routing information from the screen route stack until the routing information is at the top of the screen route stack.

In some optional implementations, the event tracking module 405 may further include:

A screen structure detecting unit configured to detect whether a screen structure corresponding to the target single page application screen is a multi-level screen.

A parent screen determining unit configured to, in response to the screen structure being the multi-level screen, determine a parent screen corresponding to the target single page application screen.

A de-duplication unit configured to obtain the event tracking information of the target single page application screen by de-duplicating event tracking information for the target single page application screen triggered by the parent screen.

In some optional implementations, the screen structure detecting unit may include:

A nesting detection subunit configured to detect whether multi-level nesting exists in a target screen container component corresponding to the target single page application screen.

A multi-level screen determining subunit configured to, in response to the multi-level nesting existing in the target screen container component, determine that the screen structure corresponding to the target single page application screen is the multi-level screen.

In some optional implementations, the apparatus may further include:

A target component obtaining module configured to obtain a target component required for running of the target single page application screen.

A component name generation module configured to, in response to an initialization configuration operation for the target component, generate a component name corresponding to the target component based on the initialization configuration operation.

Further functional descriptions of the foregoing modules and units are the same as those in the corresponding embodiments, and will not be repeated here.

The full event tracking apparatus for a single page application screen in these embodiments exist in the form of functional units. The unit herein refers to an ASIC (Application Specific Integrated Circuit) circuit, a processor and a memory that execute one or more software or firmware programs, and/or other devices that may provide the foregoing functions.

The full event tracking apparatus for a single page application screen in these embodiments can monitor a running state of the target single page application screen, and trigger event tracking of the target single page application screen according to routing information of the target single page application screen when the running state is a loading state. In this way, event tracking can be dynamically triggered during running of the target single page application screen, without modifying source code, ensuring running stability of the application, and without clearing code after full event tracking is completed, simplifying the event tracking process and further reducing maintenance costs.

Embodiments of the present disclosure further provide a computer device, which includes the full event tracking apparatus for a single page application screen shown in FIG. 12.

Figure 13:
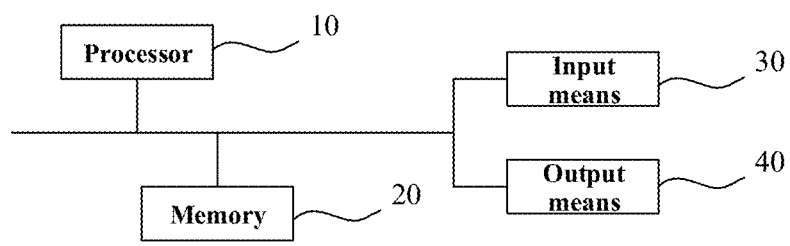
FIG. 13 is a schematic diagram of a hardware structure of a computer device according to embodiments of the present disclosure.

Please refer to FIG. 13, which is a schematic diagram of a structure of a computer device according to optional embodiments of the present disclosure. As shown in FIG. 13, the computer device includes: one or more processors 10, a memory 20, and an interface for connecting various components, including a high-speed interface and a low-speed interface. The various components are connected to each other through different buses for communication, and may be mounted on a common main board or otherwise as required. The processor may process instructions executed in the computer device, including instructions stored in or on the memory to display graphical information of a GUI on an external input/output means (such as a display device coupled to the interface). In some optional implementations, if necessary, multiple processors and/or multiple buses may be used together with multiple memories and multiple memories. Similarly, multiple computer devices may be connected, and each device provides some necessary operations (for example, as a server array, a group of blade servers, or a multi-processor system). FIG. 13 shows an example in which one processor 10 is included.

The processor 10 may be a central processor, a network processor, or a combination thereof. The processor 10 may further include a hardware chip. The hardware chip may be an ASIC, a programmable logic device, or a combination thereof. The programmable logic device may be a complex programmable logic device, a field programmable gate array, a general array logic, or any combination thereof.

The memory 20 stores instructions executable by at least one processor 10, so that the at least one processor 10 executes the method shown in the foregoing embodiment.

The memory 20 may include a program storage area and a data storage area. The program storage area may store an operating system, an application required for at least one function, and the like. The data storage area may store data created according to use of the computer device, and the like. In addition, the memory 20 may include a high-speed random access memory, and may further include a non-transitory memory, for example, at least one magnetic disk storage device, a flash memory device, or another non-transitory solid-state storage device. In some optional implementations, the memory 20 may optionally include a memory remotely disposed relative to the processor 10, and the remote memory may be connected to the computer device through a network. Examples of the network include, but are not limited to, the Internet, an intranet, a local area network, a mobile communication network, and a combination thereof.

The memory 20 may include a volatile memory, for example, a random access memory. Alternatively, the memory may include a non-volatile memory, for example, a flash memory, a hard disk, or a solid-state drive. Alternatively, the memory 20 may further include a combination of the foregoing types of memories.

The computer device further includes an input means 30 and an output means 40. The processor 10, the memory 20, the input means 30, and the output means 40 may be connected through a bus or in another manner, and FIG. 13 shows an example of connection through a bus.

The input means 30 may receive inputted numeric or character information, and generate a key signal input related to user setting and function control of the computer device, for example, a touch screen, a keypad, a mouse, a trackpad, a touchpad, an indicator pole, one or more mouse buttons, a trackball, a joystick, and the like. The output means 40 may include a display apparatus, an auxiliary lighting apparatus (for example, an LED), a haptic feedback apparatus (for example, a vibration motor), and the like. The display apparatus includes but is not limited to a liquid crystal display, a light-emitting diode, a display, and a plasma display. In some optional implementations, the display apparatus may be a touch screen.

The computer device further includes a communication interface, configured to enable the computer device to communicate with another device or a communication network.

Embodiments of the present disclosure further provide a computer-readable storage medium. The method according to the embodiments of the present disclosure may be implemented in hardware or firmware, or may be implemented as computer code that is originally stored in a remote storage medium or a non-transitory machine-readable storage medium and is to be stored in a local storage medium and downloaded through a network, so that the method described herein may be stored in such software processing on a storage medium using a general computer, a dedicated processor, or programmable or dedicated hardware. The storage medium may be a magnetic disk, an optical disc, a read-only memory, a random access memory, a flash memory, a hard disk, a solid-state drive, or the like. Further, the storage medium may further include a combination of the foregoing types of memories. It may be understood that a computer, a processor, a microprocessor controller, or programmable hardware includes a storage component that may store or receive software or computer code, and when the software or computer code is accessed and executed by the computer, the processor, or the hardware, the method shown in the foregoing embodiments is implemented.

Although the embodiments of the present disclosure are described with reference to the accompanying drawings, a person of ordinary skill in the art may make various modifications and variations without departing from the spirit and scope of the present disclosure. Such modifications and variations all fall within the scope defined by the appended claims.

The invention claimed is:

1. A full event tracking method for a screen, comprising:
   obtaining a response component corresponding to a target single page application screen;
   in response to the response component being a screen container component, extracting a component feature parameter of the screen container component;
   determining, based on the component feature parameter, whether a current running state of the target single page application screen is a loading state;
   in response to the current running state being the loading state, obtaining routing information of the target single page application screen; and
   generating event tracking information of the target single page application screen by triggering event tracking for the target single page application screen based on the routing information.

2. The method according to claim 1, wherein extracting the component parameter of the screen container component comprises:
   obtaining a plurality of subcomponents of the screen container component by parsing a component structure of the screen container component;
   determining a target subcomponent associated with a screen running state by traversing component parameters of the subcomponents; and
   determining the component feature parameter associated with the screen running state by decomposing a component parameter of the target subcomponent.

3. The method according to claim 1, wherein determining, based on the component feature parameter, whether the current running state of the target single page application screen is the loading state comprises:
   obtaining a loading feature parameter corresponding to the target single page application screen; and
   in response to the component feature parameter being consistent with the loading feature parameter, determining that the running state of the target single page application screen is the loading state.

4. The method according to claim 1, wherein generating the event tracking information of the target single page application screen by triggering event tracking for the target single page application screen based on the routing information comprises:
   detecting whether the routing information exists in a screen route stack corresponding to the target single page application screen; and
   in response to the routing information not existing in the screen route stack, triggering the page view event tracking for the target single page application screen, and placing the routing information of the target single page application screen at top of the screen route stack.

5. The method according to claim 4, further comprising:
   in response to the routing information existing in the screen route stack, obtaining a location of the routing information in the screen route stack and historical routing information prior to the location;
   triggering a page view event tracking of the target single page application screen corresponding to the routing information and a page leave event tracking of a screen corresponding to the historical routing information, and removing the historical routing information from the screen route stack until the routing information is at the top of the screen route stack.

6. The method according to claim 1, further comprising:
   detecting whether a screen structure corresponding to the target single page application screen is a multi-level screen;
   in response to the screen structure being the multi-level screen, determining a parent screen corresponding to the target single page application screen; and
   obtaining the event tracking information of the target single page application screen by de-duplicating event tracking information for the target single page application screen triggered by the parent screen.

7. The method according to claim 6, wherein detecting whether the screen structure corresponding to the target single page application screen is the multi-level screen comprises:
   detecting whether multi-level nesting exists in a target screen container component corresponding to the target single page application screen; and
   in response to the multi-level nesting existing in the target screen container component, determining that the screen structure corresponding to the target single page application screen is the multi-level screen.

8. The method according to claim 1, further comprising:
obtaining a target component required for running of the target single page application screen; and
in response to an initialization configuration operation for the target component, generating a component name corresponding to the target component based on the initialization configuration operation.

9. A computer device, comprising:
a memory and a processor, the memory and the processor communicatively connected to each other, the memory having computer instructions stored therein, the computer instructions, when executed by the processor, causing the computer device to:
obtain a response component corresponding to a target single page application screen;
in response to the response component being a screen container component, extract a component feature parameter of the screen container component;
determine, based on the component feature parameter, whether a current running state of the target single page application screen is a loading state;
in response to the current running state being the loading state, obtain routing information of the target single page application screen; and
generate event tracking information of the target single page application screen by triggering event tracking for the target single page application screen based on the routing information.

10. The computer device according to claim 9, wherein the computer instructions causing the computer device to extract the component parameter of the screen container component further cause the computer device to:
obtain a plurality of subcomponents of the screen container component by parsing a component structure of the screen container component;
determine a target subcomponent associated with a screen running state by traversing component parameters of the subcomponents; and
determine the component feature parameter associated with the screen running state by decomposing a component parameter of the target subcomponent.

11. The computer device according to claim 9, wherein the computer instructions causing the computer device to determine, based on the component feature parameter, whether the current running state of the target single page application screen is the loading state further cause the computer device to:
obtain a loading feature parameter corresponding to the target single page application screen; and
in response to the component feature parameter being consistent with the loading feature parameter, determine that the running state of the target single page application screen is the loading state.

12. The computer device according to claim 9, wherein the computer instructions causing the computer device to generate the event tracking information of the target single page application screen by triggering event tracking for the target single page application screen based on the routing information further cause the computer device to:
detect whether the routing information exists in a screen route stack corresponding to the target single page application screen; and
in response to the routing information not existing in the screen route stack, trigger the page view event tracking for the target single page application screen, and place the routing information of the target single page application screen at top of the screen route stack.

13. The computer device according to claim 12, wherein the computer instructions further cause the computer device to:
in response to the routing information existing in the screen route stack, obtain a location of the routing information in the screen route stack and historical routing information prior to the location;
trigger a page view event tracking of the target single page application screen corresponding to the routing information and a page leave event tracking of a screen corresponding to the historical routing information, and remove the historical routing information from the screen route stack until the routing information is at the top of the screen route stack.

14. The computer device according to claim 9, wherein the computer instructions further cause the computer device to:
detect whether a screen structure corresponding to the target single page application screen is a multi-level screen;
in response to the screen structure being the multi-level screen, determine a parent screen corresponding to the target single page application screen; and
obtain the event tracking information of the target single page application screen by de-duplicating event tracking information for the target single page application screen triggered by the parent screen.

15. The computer device according to claim 14, wherein the computer instructions causing the computer device to detect whether the screen structure corresponding to the target single page application screen is the multi-level screen further cause the computer device to:
detect whether multi-level nesting exists in a target screen container component corresponding to the target single page application screen; and
in response to the multi-level nesting existing in the target screen container component, determine that the screen structure corresponding to the target single page application screen is the multi-level screen.

16. The computer device according to claim 9, wherein the computer instructions further cause the computer device to:
obtain a target component required for running of the target single page application screen; and
in response to an initialization configuration operation for the target component, generate a component name corresponding to the target component based on the initialization configuration operation.

17. A non-transitory computer-readable storage medium having computer instructions stored thereon, wherein the computer instructions are configured to cause a computer:
obtain a response component corresponding to a target single page application screen;
in response to the response component being a screen container component, extract a component feature parameter of the screen container component;
determine, based on the component feature parameter, whether a current running state of the target single page application screen is a loading state;
in response to the current running state being the loading state, obtain routing information of the target single page application screen; and generate event tracking information of the target single page application screen by triggering event tracking for the target single page application screen based on the routing information.

18. The medium according to claim 17, wherein the computer instructions causing the computer to extract the component parameter of the screen container component further cause the computer to:

obtain a plurality of subcomponents of the screen container component by parsing a component structure of the screen container component;

determine a target subcomponent associated with a screen running state by traversing component parameters of the subcomponents; and determine the component feature parameter associated with the screen running state by decomposing a component parameter of the target subcomponent.

19. The medium according to claim 17, wherein the computer instructions causing the computer to determine, based on the component feature parameter, whether the current running state of the target single page application screen is the loading state further cause the computer to:

obtain a loading feature parameter corresponding to the target single page application screen; and in response to the component feature parameter being consistent with the loading feature parameter, determine that the running state of the target single page application screen is the loading state.

20. The medium according to claim 17, wherein the computer instructions causing the computer to generate the event tracking information of the target single page application screen by triggering event tracking for the target single page application screen based on the routing information further cause the computer to:

detect whether the routing information exists in a screen route stack corresponding to the target single page application screen; and in response to the routing information not existing in the screen route stack, trigger the page view event tracking for the target single page application screen, and place the routing information of the target single page application screen at top of the screen route stack.

\* \* \* \* \*